(12) United States Patent
Kaufman et al.

(10) Patent No.: US 6,710,576 B1
(45) Date of Patent: Mar. 23, 2004

(54) AUXILIARY BATTERY ADAPTER FOR CELLULAR TELEPHONES

(75) Inventors: Ronald A. Kaufman, Loganville, GA (US); Elizabeth A. Bryant, Atlanta, GA (US); Due Quoc Huynh, Lawrenceville, GA (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/479,541

(22) Filed: Jan. 7, 2000

(51) Int. Cl.[7] .................................................. H02J 7/00
(52) U.S. Cl. ........................................ 320/107; 320/110
(58) Field of Search ................................. 320/107, 110, 320/113; 429/96, 97, 98, 123; 455/89, 90; 307/150

(56) References Cited

U.S. PATENT DOCUMENTS

| | | | |
|---|---|---|---|
| 5,136,229 A | 8/1992 | Galvin | 320/112 |
| D372,896 S * | 8/1996 | Nagele et al. | D13/103 |
| 5,555,448 A * | 9/1996 | Thiede et al. | 455/89 |
| D375,932 S | 11/1996 | Nagele et al. | D13/103 |
| 5,610,497 A | 3/1997 | Croughwell | 307/70 |
| 5,738,954 A * | 4/1998 | Latella et al. | 429/97 |
| 5,843,595 A | 12/1998 | Kawakatsu | 429/97 |
| 5,851,691 A | 12/1998 | Palmer et al. | 429/97 |
| 5,857,148 A * | 1/1999 | Weisshappel et al. | 455/90 |
| 5,922,489 A | 7/1999 | Adachi | 429/100 |

* cited by examiner

*Primary Examiner*—Michael Sherry
*Assistant Examiner*—Lawrence Luk
(74) *Attorney, Agent, or Firm*—Philip H. Burrus, IV

(57) ABSTRACT

This invention is an adapter that fits on a cellular phone that allows a plurality of batteries to be connected in parallel. More specifically, this invention is an adapter that allows a standard cellular telephone battery to be fitted on a phone in the same fashion that an extended capacity or "aux" battery would. The adapter has an aperture for accommodating a battery, as well as electrical connections which couple the battery contacts to the phone's electrical contacts. An end user can use this invention to power a phone. Additionally the device can be used in conjunction with a battery charger to charge a spare battery.

9 Claims, 6 Drawing Sheets

AUXILIARY BATTERY ADAPTER FOR CELLULAR TELEPHONES

TECHNICAL FIELD

The invention generally relates to batteries and more specifically to a battery apparatus for a device.

BACKGROUND

In recent years, improvements in battery technology and electronic device efficiency have made portable electronic devices popular. While once requiring power from a conventional wall outlet or a vehicle's ignition system, electronic devices, such as computers or cellular telephones, can now be powered by lightweight batteries. Such batteries are typically in the form of a rechargeable battery pack— multiple rechargeable electrochemical cells disposed within a housing—manufactured to attach to portable electronic devices. Upon attachment, electrical contacts located on the battery pack housing contact mating contacts located on the device housing to connect the cells of the battery to the circuitry in the device. The portable electronic device operates until the electrochemical cells within the battery pack become depleted. The battery must then be recharged.

Once depleted, the user has three options: First, he may remove the depleted battery pack and attach another charged battery pack to continue operation of the portable electronic device. Second, he may attach a charger or cigarette lighter adapter capable of powering the phone. Third, he can discontinue use of the phone and place the phone in a charger to allow the depleted battery to recharge.

Each of these options has a distinct disadvantage. For the first option of switching batteries, removal of the battery pack, even momentarily, effectively disconnects the portable electronic device from its power source. Where a cellular phone user is participating in a call, removal of the battery pack causes the call to be terminated. This is an annoying exercise and is considered to be down right rude in some social circles.

The second option, that is connecting the phone to a power supply, is also inconvenient in that the user now becomes tethered to a wall or car as the power supply must also have a power source. The convenience of a portable phone is now eliminated. What is the point of a portable cellular telephone if you have to stay connected to a wall? One might as well use a conventional telephone with a wire that is permanently attached to the wall!

The third option, that of putting a phone in a charger, renders the phone useless in that any call that was being made must not only be terminated, but further can not be reinitiated until the battery is sufficiently charged. This can take up to and over an hour to accomplish.

Unfortunately, the demand for cellular phone talk time is outpacing the development in energy storage capacity of electrochemical cells. In other words, people are demanding more energy from a phone in a day than can be delivered by a single cell. For example, with the recent decline in cellular telephone rates, some people talk on cellular telephones for five or more hours per day, while a typical cellular telephone battery may only offer about three hours of talk time before a recharge is required.

Some cellular phone manufacturers have attempted to reconcile this problem by making auxiliary batteries that have higher capacities than do standard batteries. For example, Motorola manufactures several different size batteries for its ever-popular StarTac Series phone. The highest capacity battery is commonly referred to as the auxiliary— or "aux" —battery. U.S. Design Pat. No. D400,495 illustrates the housing for such a battery. Unfortunately, however, some people do not own a high-capacity, or "aux", battery. They may only own the standard battery (illustrated in U.S. Design Pat. No. D374,424).

Therefore, what is needed is an apparatus and method that permits the user to extend the operation of the device without the need for an auxiliary battery.

SUMMARY OF THE INVENTION

This invention is an adapter that connects to the rear portion of a cellular telephone. The adapter contains an aperture for accommodating a standard cellular telephone battery. The adapter includes electrical contacts for coupling the contacts of the battery to the electrical contacts of the phone. The adapter is used in conjunction with a standard battery to provide additional power to the phone. Also, the adapter can be used with a battery charger to charge the standard battery therein by simply inserting the phone-adapter-battery combination into a charger.

DETAILED DESCRIPTION OF THE INVENTION

Figure 1:
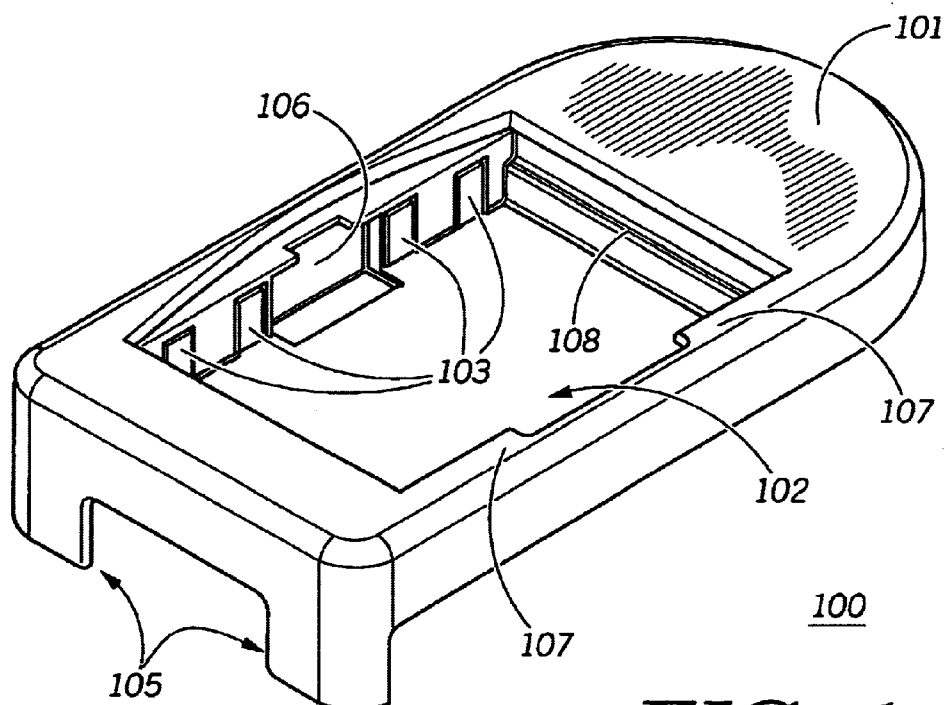
FIG. 1 is a top, back, right isometric view of a preferred embodiment of the invention.

Referring now to FIG. 1, illustrated therein is an adapter assembly for a standard cellular telephone battery 100 in accordance with the invention. The adapter includes a plastic housing 101 with an aperture 102 wherein a standard cellular telephone battery may be inserted. The housing 101 is equipped with a first set electrical contacts 103 for mating to the electrical contacts of the standard cellular telephone battery. This first set of electrical contacts 103 are coupled to electrical conductors that mate to the electrical contacts of the phone as will be described later. Additionally, electrical circuitry can be connected to the contacts 103 and disposed within the adapter 101.

A latch recess 106 is disposed upon the adapter 101. The latch recess 106 is designed to engage the latching mechanism of the standard battery and thus hold the battery in the adapter 101. There is also a retention member 107 on the adapter 101 which is located on the opposite side of the aperture 102 from the latch recess 106. The retention member 107 acts as both a fulcrum during insertion of the battery and as a physical stop when the battery is inserted. There is also a battery specific rating coping 108 designed into the adapter 101 which ensures a proper fit between the standard battery and the adapter 101.

The adapter 101 comprises two latching feet 105. These latching feet 105 are designed to mate with recesses on the phone. The connection process to the phone is similar to that of the battery to the adapter. The latching feet 105 are placed in the appropriate recesses of the phone, with the adapter forming approximately a 45 degree angle with the phone. The adapter is then rotated towards the phone until it snaps into place. It should be noted that the standard battery may be inserted or removed from the phone regardless of whether the adapter is connected to the phone.

The adapter may be manufactured by numerous well known techniques. A preferred method of manufacture is injection molded plastic. In such a process a tool is made by cutting a negative image out of metal and then injecting molten plastic in to the cavity. Once the plastic cools, the halves of the tool are separated and the plastic piece is removed. The adapter can then be fitted with electrical contacts and circuitry and mechanical connectors by either hand or machine. Alternatively, the adapter may also be made of metal, wood, epoxy, resin, acrylic, polycarbonate, polystyrene, ceramic, and the like.

Figure 2:
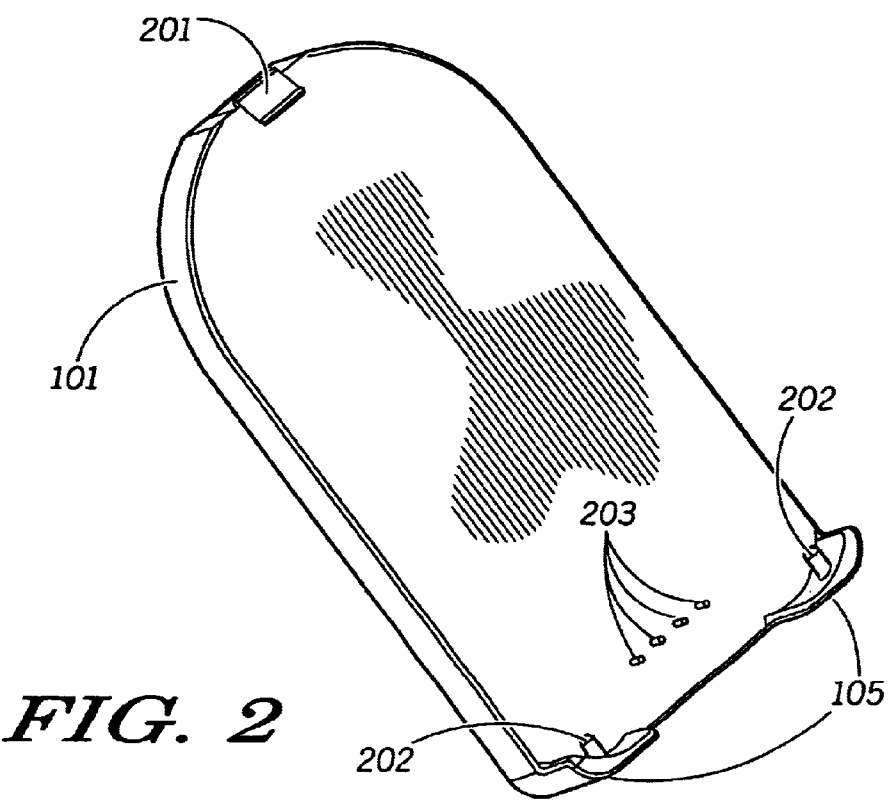
FIG. 2 is a bottom, top, left isometric view of a preferred embodiment of the invention.

Referring now to FIG. 2, illustrated therein is an isometric view of the bottom of the adapter 101. There is a second set of electrical contacts 203 which are coupled to the first set of electrical contacts shown in FIG. 1. These contacts 203 deliver power to and from the additional battery. They mate to a set of electrical contacts disposed on the phone, as will be seen in FIG. 5.

There are mating pins 202 located on the latching feet 105 of the adapter 101. These mating pins 202 fit within the mating recesses of the phone, as will be described later. The mating pins 202, in conjunction with the snap 201 are used to hold the adapter 101 securely to the phone.

Figure 3:
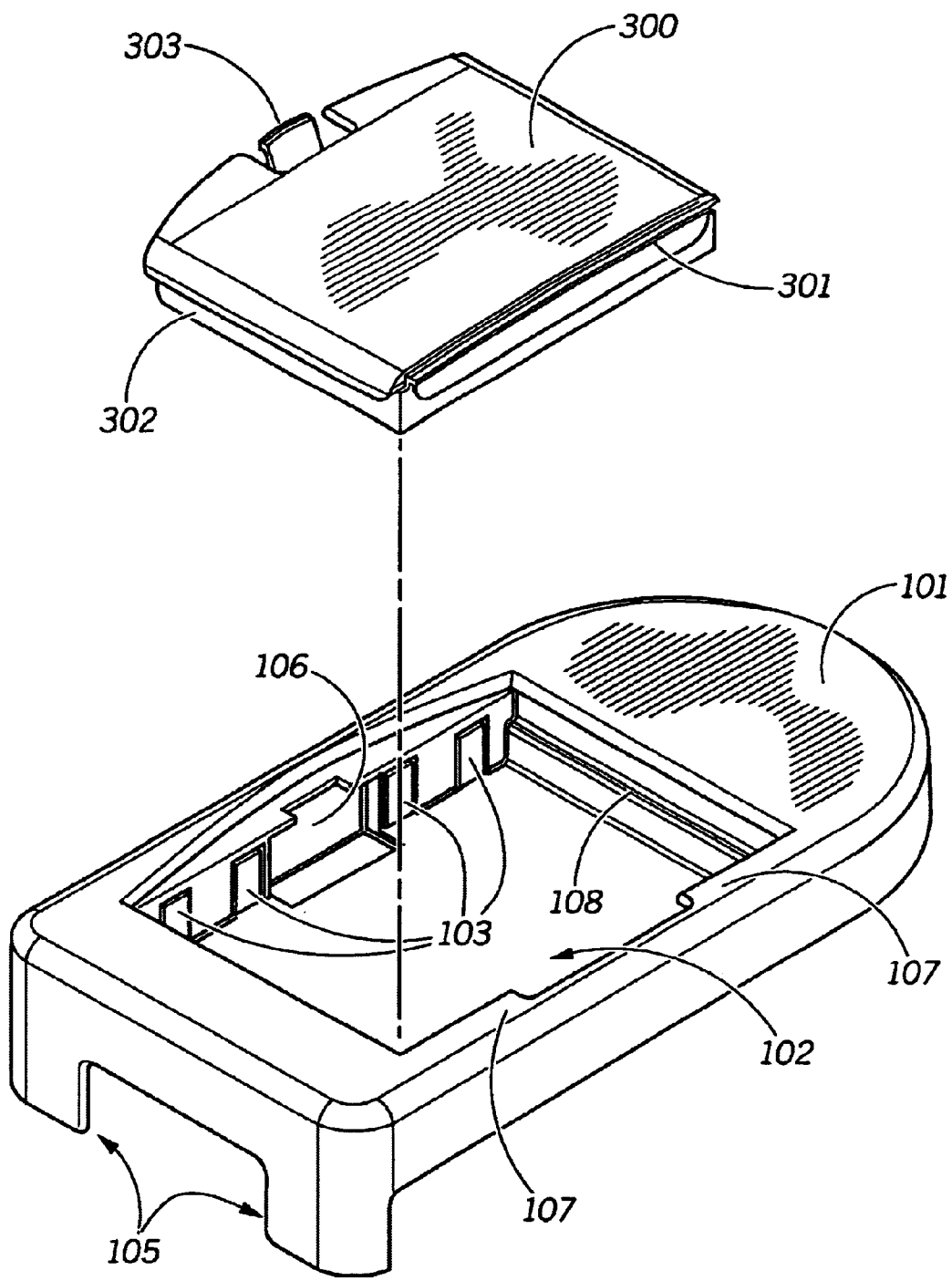
FIG. 3 is an isometric exploded view of a battery and a preferred embodiment of the invention.

Referring now to FIG. 3, illustrated therein is a battery and adapter in accordance with the invention. As in FIG.1, the aperture 102, first set of electrical contacts 103, mating feet 105, latch recess 106, retention members 107 and mating coping 108 are all shown. Additionally, a standard cellular telephone battery 300 having a latch 303, a fulcrum member 301, and a mating edge 302 disposed thereupon.

When the battery is inserted into the adapter 101, the end of the battery opposite the electrical contacts is inserted under the retention member such that the battery forms about a 45 degree angle with the adapter 101. The battery is then rotated in a counter-clockwise fashion until the battery latch engages with the latch recess 106 thereby locking the battery in place and causing the electrical contacts of the battery to mate with the electrical contacts of the adapter 103. This will be illustrated in more detail in subsequent figures.

Figure 4:
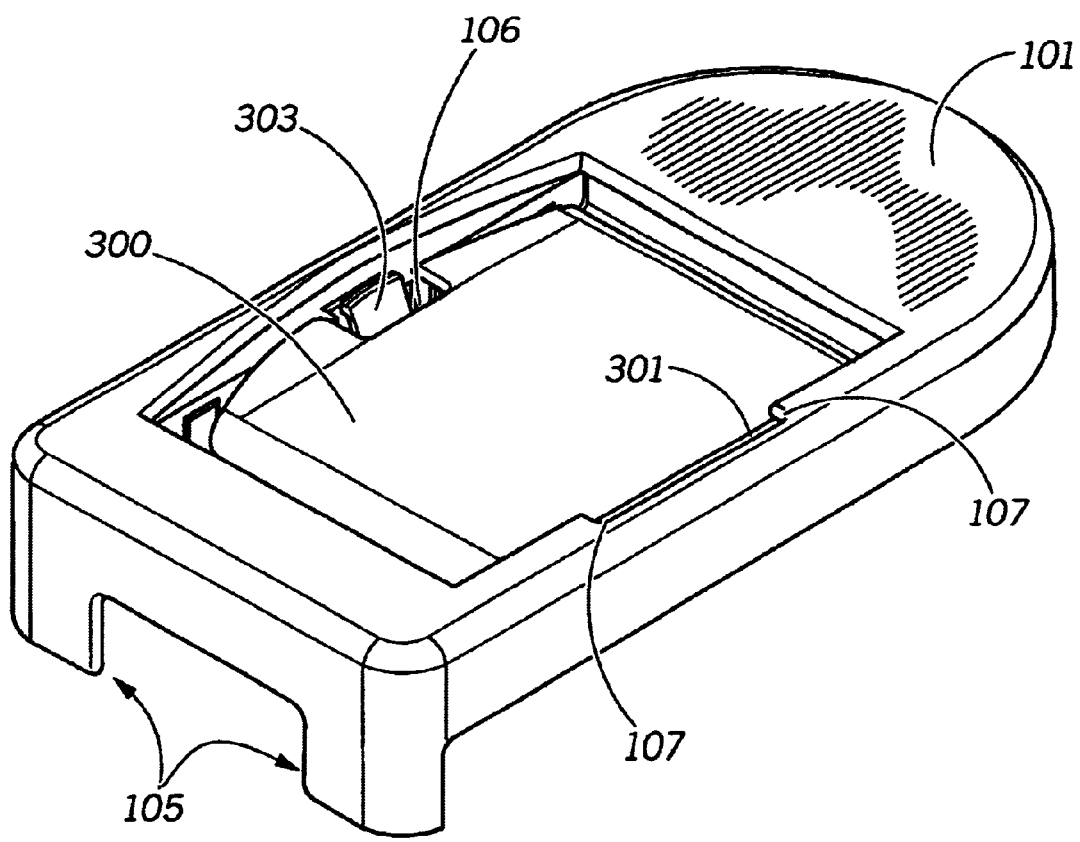
FIG. 4 is an isometric view of a battery coupled to a preferred embodiment in accordance with the invention.

Referring now to FIG. 4, illustrated therein is a battery 300 that has been inserted and latched into the adapter 101 in accordance with the invention. The fulcrum member is now securely being held in place by the retention members 107. The latch 303 is securely engaged with the latch recess 106. To remove the battery 300 from the adapter 101, a user simply presses the latch 303 enough to disengage it from the latch recess 106. The user then rotates the battery 300 clockwise and lifts the battery 300 from the adapter.

Figure 5:
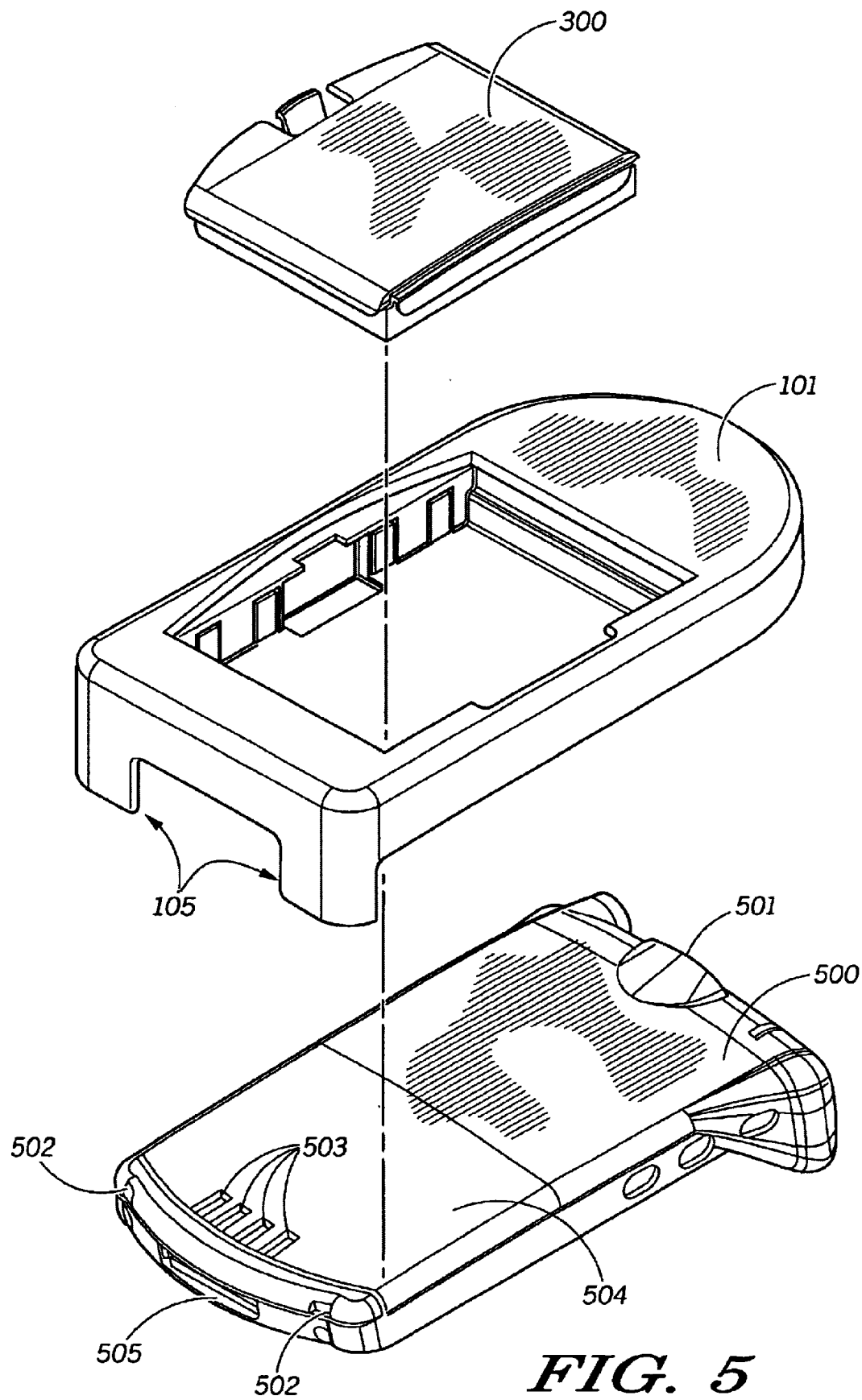
FIG. 5 is an isometric exploded view of a battery, a preferred embodiment of the invention and a back portion of a cellular telephone.

Referring now to FIG. 5, illustrated therein is an exploded view of a standard battery 300, a portion of a cellular telephone 500, and an adapter in accordance with the invention. The phone 500 is equipped with a back cover 504 having battery electrical contacts 503 disposed thereupon. The electrical contacts are connected to the primary battery circuit which is responsible for powering the phone 500. The phone 500 also has a charging connector 505 to which a power supply or charger may be connected. The phone 500 has recesses 502 for receiving the mating feet 105 of the connector. There is a mating snap recess 501 disposed on the phone 500 as well. The adapter 101 is connected to the phone 500 by first inserting the mating feet into the recesses 502, with the adapter 101 forming about a 45 degree angle with the phone. The adapter 101 is then rotated towards the phone until the snap of the adapter mates with the mating snap recess 501, thereby securing the adapter 101 to the phone. The battery 300 may then be inserted into the adapter 101 as previously described.

As mentioned, the second set of electrical contacts of the adapter 101 connects with the battery electrical contacts 503 disposed on the back cover 504 when the adapter 101 is attached to the phone 500. In this manner, the standard battery 300 is connected in parallel with the primary battery thereby creating an effective "double capacity" battery. By using the adapter 101 and a standard battery 300, the talk time of the phone 500 is instantly doubled. The standard battery 300 may be recharged either by leaving it in the adapter 101 connected to the phone 500 and inserting the entire assembly into a charger, or by removing the standard battery from the adapter and inserting it independently into a charger. Additionally, if there is charging circuitry in the phone, the user must only connect a power supply to the phone itself to charge the battery in the adapter as well as the main battery.

Figure 6:
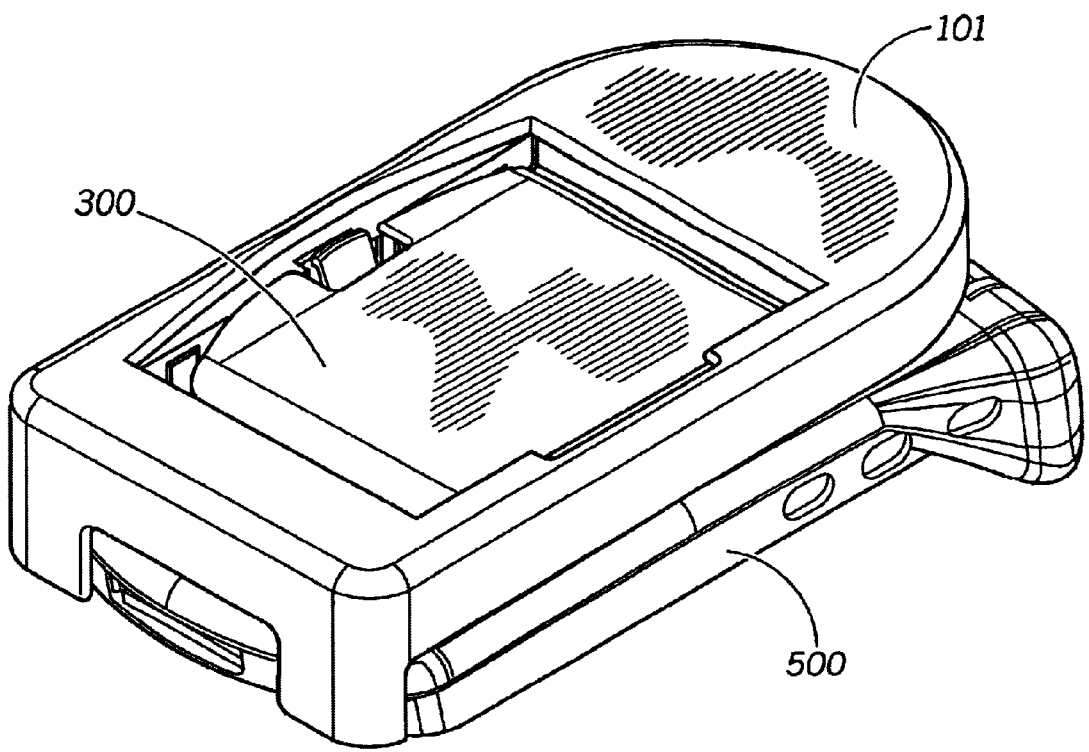
FIG. 6 is an isometric view of a battery coupled to a preferred embodiment of the invention coupled to a phone in accordance with the invention.

Referring now to FIG. 6, illustrated therein is a battery-adapter-phone assembly 600 in accordance with the invention. As shown, the battery 300 has been inserted into the adapter 101 which is connected to the phone 500. In this manner, an equivalent battery has been created having double the capacity of a normal cellular phone battery without the need for an auxiliary battery.

Figure 7:
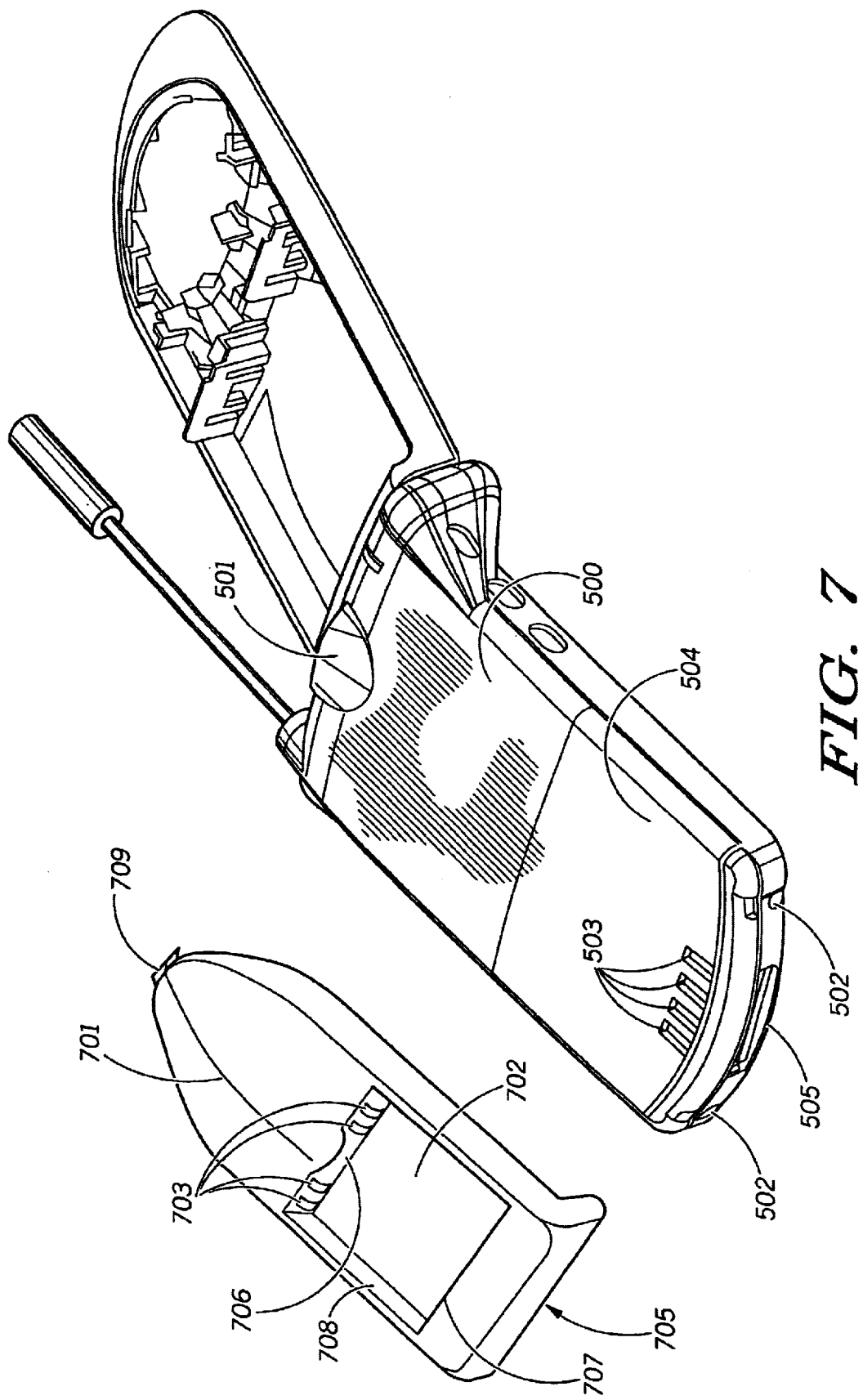
FIG. 7 is an alternative embodiment of the invention.

Referring now to FIG. 7, illustrated therein is an alternative embodiment of the present invention. Shown is a cellular telephone 500, having a back surface 504 with phone electrical contacts 503. The phone electrical contacts 503 deliver power to the electronic circuitry located within the phone 500. As in FIG. 5, the phone 500 also contains a power supply connector 505 and mating recesses 502. There is a snap recess 501 for accommodating the snap 709 of the adapter 701.

In this embodiment, the adapter still contains electrical contacts 703, an aperture 702 for receiving a battery, a retention member 707, and mating feet 705. However, in this embodiment the aperture 702 is rotated 90 degrees such that the electrical contacts 703 are parallel to the phone electrical contacts.

In addition to extending battery life, this invention has numerous other advantages over the prior art. For example, the adapter is effectively an extra battery charger. As most phones have battery charging circuitry, when a battery is placed in the adapter and the adapter is connected to a phone, the extra battery in the adapter may be charged by simple connecting a power supply to the phone. The adapter thus offers a cost-efficient alternative to having to carry a desktop charger while traveling. Additionally, the user is assured that the extra battery is being charged with a manufacturer approved charging algorithm. There are reliability issues with charging lithium ion batteries in an incorrect fashion. If a person buys an inappropriate charger, their battery may be charged inadequately. By using the adapter and the charging circuitry in the phone, the user is assured of proper charging procedures.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while a preferred embodiment has described the invention as relating to a cellular telephone, the device could as easily be used on portable radios, compact disc players, pagers, portable scheduling assistants, televisions, and the like.

What is claimed is:

1. A removeable adapter for coupling a second battery to a cellular phone having a first battery coupled thereto, the adapter comprising:

A) an aperture for receiving the second battery, wherein a mechanical form factor of the second battery is the equivalent to that of the first battery;

B) a first set of electrical contacts for coupling to the second battery;

C) a second set of electrical contacts coupled to the first set of electrical contacts for coupling to the phone; and D) latching means for attaching the adapter to the cellular phone.

2. An adapter as in claim 1, wherein the latching means further comprises mating feet.

3. An adapter as in claim 2, wherein the latching means further comprises a snap.

4. An adapter as in claim 3, wherein the mating feet further comprise mating pins.

5. An adapter as in claim 4, wherein the adapter further comprises a latch recess for receiving a battery latch.

6. The adapter as in claim 5, wherein the adapter further comprises retaining members.

7. The adapter as in claim 6, wherein the aperture comprises mating coping.

8. The adapter as in claim 7, wherein the adapter is made from a material selected from the group consisting of plastic, of metal, wood, epoxy, resin, acrylic, polycarbonate and polystyrene.

9. The adapter of claim 8 further comprising electronic components.

* * * * *